(12) United States Patent
Jones

(10) Patent No.: US 6,840,136 B1
(45) Date of Patent: Jan. 11, 2005

(54) PEDAL DRIVE MECHANISM

(75) Inventor: Earle H Jones, 410 Mt. Jupiter Dr. SW., Issaquah, WA (US) 98027

(73) Assignee: Earle H Jones, Issaquah, WA (US)

( * ) Notice: Subject to any disclaimer, the term of this patent is extended or adjusted under 35 U.S.C. 154(b) by 0 days.

(21) Appl. No.: 09/694,419

(22) Filed: Oct. 23, 2000

(51) Int. Cl.[7] .......................... B62K 21/12; B62M 1/02; F16H 9/00

(52) U.S. Cl. .................... 74/594.2; 74/594.1; 280/259; 474/160

(58) Field of Search .................... 474/78, 160, 165, 474/152, 150, 166, 161; 74/594.1, 594.2; 280/259, 257, 261, 260

(56) References Cited

U.S. PATENT DOCUMENTS

| | | | |
|---|---|---|---|
| 4,029,334 A | | 6/1977 | Trammell, Jr. |
| 4,159,652 A | * | 7/1979 | Trammell, Jr. .............. 474/141 |
| 4,218,931 A | * | 8/1980 | Tritenne ..................... 474/160 |
| 4,706,516 A | | 11/1987 | Xi |
| 5,067,370 A | * | 11/1991 | Lemmens ................... 474/152 |
| 5,426,997 A | * | 6/1995 | Brion ......................... 474/160 |
| 5,515,746 A | | 5/1996 | Yamaguchi |
| 5,816,599 A | * | 10/1998 | Soejima et al. ............. 280/259 |
| 5,899,477 A | | 5/1999 | Vergara |
| 6,085,613 A | * | 7/2000 | Niculescu .................. 74/594.2 |

FOREIGN PATENT DOCUMENTS

| | | | |
|---|---|---|---|
| FR | 2594402 A1 | * | 8/1987 |
| JP | 3-217389 | * | 9/1991 |
| WO | WO 02/28580 A1 | | 11/2002 |

OTHER PUBLICATIONS

Science of Cycling; Biomechanics of Cycling: Studies of Pedaling Mechanics of Elite.
Pursuit Riders; Cavanaugh + Sanderson.

* cited by examiner

*Primary Examiner*—Marcus Charles

(57) ABSTRACT

A pedal drive mechanism that provides continuous, uninterrupted torque to the drive chain or belt. The continuous torque effect is a result of establishing two separate but connectively joined axes of rotation that transmit pedal crank force to the drive chain (55). The assembly of a right pedal crank (29) rotative mounted about left pedal output crank (28) are connectively fastened (46) to the left pedal crank (38) through the bottombracket bearing (37) defines the first axis of rotation. The assembly of the chain sprockets (35, 34 and 33), sprocket interface (25) and sprocket support (24) are rotatively mounted by a sealed bearing (40) about a bearing inner race support (23) and eccentric flange (22) establish a second axis of rotation. The fixtures of these two axes of rotation are connectively joined by articulating links (26) with self-aligning sealed bearings (27).

14 Claims, 8 Drawing Sheets

OUTPUT TORQUE CURVE FOR CONVENTIONAL PEDAL DRIVE MECHANISM

OUTPUT TORQUE CURVE FOR THE PRESENT INVENTION
(270 DEG IS AT TOP DEAD CENTER)

PEDAL DRIVE MECHANISM

BACKGROUND OF THE INVENTION

1. Field of the Invention

The present invention relates generally to the field of opposed crank arm chain drive systems, and more particularly to pedal drive mechanisms for bicycles, or other pedal-powered conveyances.

2. Description of the Prior Art

The first "bicycle", comprised of two wheels, a seat, steering and pedals was produced in 1839 by Kirkpatrick MacMillan. Pedals were connected to a rear wheel by levers and operated in a reciprocating step fashion. In 1863 the first radial crank-powered pedal bicycle was invented by Pierre Michaux of France. In its design pedals were attached directly to a front wheel by crank arms. In 1874 the "high-wheeler" bicycle was introduced by James Starley of England. This bicycle design is well known for its large 60 to 80 inch front wheel and a small rear wheel. As with earlier designs, pedals of the high-wheeler were attached directly to the front wheel by crank arms. Handlebars were attached to the front wheel by a fork mated to a distinctive "S" shaped frame. The high-wheeler design allowed the rider to remain seated upright while providing power to the front wheel mounted pedals. In 1879 Harry Lawson introduced a rear wheel drive "bicylette". His design was the first to use two wheels of the same size, a chain drive sprocket with pedals located under and slightly forward of the rider's seat and the standard "diamond" frame design still in use today. The pedal sprocket was connected to the rear wheel sprocket by a roller chain. Propulsion was provided to the rear wheel by the pedaling action of the rider.

Drive systems of some of the first bicycles used rigid wheel hubs. Eventually, the "coaster hub" design allowed the rider to pedal to maintain speed or coast without pedaling. Further advances in drive systems provided a variable speed transmission by augmenting the internal mechanism of the original coaster brake design. These transmissions were two or three-speed models controlled by a gearshift lever on the handlebars. Later, 10, 18 and 21-speed gear systems were introduced. The higher quantity gear systems used two or three different size chain sprockets attached to the pedal crankshaft and five, six or seven sprockets of different sizes attached to the rear wheel hub. A "derailleur" guided the drive chain from one size sprocket to another changing gear ratios as a result. An "S" shaped spring tensioning device attached to the rear wheel derailleur provided for differing lengths of slack in the chain during shifting. On most design versions, two derailleurs were used, one for the pedal (chain) sprocket and one for the rear wheel sprocket. Shifting was actuated by a cable link from the derailleur to a fixed position on the handlebars or the frame. Each derailleur would have its own shifting actuator.

In all previous pedal/crank arm/sprocket designs the pedal crankshafts would be 180 degrees opposed to each other ((the right pedal would be at top dead center (TDC) while the left pedal was at bottom dead center (BDC) or visa verse)). Because of the pedal/sprocket geometry and the position of the rider seated above the pedals, very little drive force could be applied when the pedals are within 10 degrees before and after TDC. Conversely, when the pedal cranks were both horizontal to the ground the rider could apply the greatest force to the sprocket drive chain system.

Over the last 100 years drive systems of modern bicycles have evolved to incorporate a set of opposed crank arms and pedals attached to a toothed (chain) sprocket which was attached to a central crankshaft and bearing on the bicycle frame. Power from the pedal/crank arm/sprocket assembly was transmitted to a bicycle's rear wheel sprocket by a roller chain. A rider obtains forward propulsion by applying downward force on one leading pedal (the power stroke) and then the other in reciprocating fashion in a forward moving rotation. Almost without exception chain sprockets, and wheel sprockets, have been radially symmetrical. The only exception was a recent innovation where the chain sprocket was designed in an elliptical pattern with the greatest radial pass of the sprocket teeth coinciding with the position of crank arms, thus increasing drive chain speed but not torque.

Inherent in a radially symmetrical pedal/crank arm/sprocket drive assembly is the portion of sprocket rotation where the opposed pedals are at TDC and BDC, and because of the relationship of the riders legs and feet to the pedals (similar to an internal combustion engine with the piston and crank shaft operation) there is little, if any, positive torque during this stage. Thus, the area of the pedal sprocket rotation where there is little or no positive torque is the rotation area of approximately 10 degrees before TDC and BDC, and 10 degrees after TDC and BDC. The present invention drastically reduces this mechanical deficiency.

Over the years many innovations have addressed various deficiencies of a bicycle's drive system. In June of 1977 a patent was issued (U.S. Pat. No. 4,029,334) for a step-type pedal drive system that allows the rider to propel a bicycle by pumping a set of reciprocating pedals instead of rotatively pedaling. This invention allows the rider to propel a bicycle by stepping on the pedals in a back-and-forth fashion instead pedaling in a rotative fashion found in the traditional pedal/crank arm/sprocket design of most modern bicycles. The deficiencies of this step-type drive system are the considerable number of components required in the mechanism itself and the fact that a completely new bicycle frame design would be required because this invention cannot be retrofitted to existing bicycle frames.

In July of 1979 a patent was issued (U.S. Pat. No. 4,159,652 a continuation-in-part of U.S. Pat. No. 3,906,807) for a bicycle drive assembly that permits the rate of pedal travel to be calculated and adjusted to more efficiently respond to pedal forces. This invention represents one of the first attempts at altering the opposed relationship of the pedals to eliminate the zero torque zones at top and bottom dead center of crank arm rotation. This was accomplished by relatively offsetting the centers of rotation of the chain sprocket (drive axis) and crank arms (power axis) and interconnecting them through a control mechanism and drive member to produce different rates of crank arm rotation speed. Because of the eccentric relationship between rotational centers of the chain sprocket and crank arms the power stroke crank arm (180 degrees of rotation on the forward most crank arm on a conventional bicycle drive mechanism) would decelerate and the return stroke crank arm (180 degrees of rotation on the aft crank arm) would accelerate thus eliminating dead centers at the top and bottom of each pedal stroke. The control mechanism allows the operator to vary the degree of eccentricity between the sprocket and crank arm centers thus varying the rate of acceleration and deceleration of the crank arms as they rotate through a pedal cycle. Principal deficiencies of this invention include its limited adaptability to all types of pedal-powered mass produced bicycles, its reliance on custom built recumbent style bicycle frames with complicated drive components to accommodate its intended increase in pedal efficiencies and its inability to use existing off-theshelf bicycle components such as chain sprockets (chainrings), crank arm spindles, or axles (bottom bracket spindle/bearing sets) and standard pedals readily available at retail bicycle establishments.

In August of 1980 a patent was issued (U.S. Pat. No. 4,218,931) for a bicycle crank unit in which the chain wheel, or chain wheels, (chain sprockets) are eccentric with respect to the crank arm spindle (crank axle) and the crank axle carries an externally toothed pinion to engage within an internal gear carried coaxially by the chain sprocket. This provides a step down gearing between the pedal crank arms and the chain sprocket and enhances the mechanical advantages of the drive transmission. The singular advantage of this invention is to provide increase torque through an internal gear reduction system. The principal deficiency of this invention is that the same gear reduction and resulting increase in torque can be achieved through external chain sprockets and common gear derailleur systems available on almost all commercially available bicycles.

In November of 1987 a patent was issued (U.S. Pat. No. 4,706,516) for a radially movable pedal crank that provides greater rotational torque during the power stroke (when a rider applies force to the forward most pedal rotatively). This is accomplished by incorporating a series of eccentric plates, roller bearings and movable crank arms that when positioned on and around the bicycle crank sprocket would cause the crank arms to increase in radial length during the power stroke and decrease in radial length during the return stroke of pedal rotation. While this invention increases torque during the power stroke the rider's pedals have to cover a greater distance because of the increased circumference of a longer crank arm, thus requiring the rider to exert more effort to cover the same ground distance on the bicycle. Although the radially movable crank invention can be retrofitted to existing bicycle frames, a custom crank axle and bearing is required, components are numerous and heavy, and the assembly introduces considerable torsion and frictional forces in the drive system.

In May of 1996 a patent was issued (U.S. Pat. No. 5,515,746) for an eccentric traveling device which increases rotational torque without elongating the crank arms. This is accomplished by incorporating a chain sprocket rotatively mated to an eccentric plate, with its centerline aft of crankshaft centerline and a working plate attached to the crankshaft. The working plate, concentric to the centerline of the crankshaft and pedal crank, is connected to the chain sprocket by a set of five link arm assemblies rotatively positioned about the working plate. As the pedal/crank arm/working plate assembly rotates on the drive frame centerline (centerline of the crankshaft housing—"bottom bracket") of the crankshaft, the rotative force is transferred to the chain sprocket, which has a center line aft of the crankshaft, to a roller chain and finally to the rear wheel. Similar to the radially movable pedal crank design described above, the eccentric traveling device can be retrofitted to existing bicycle frames. However, a custom crank axle and bearing is required, components are numerous and the assembly introduces considerable torsion and frictional forces in the drive system.

In July of 2000 a patent was issued (U.S. Pat. No. 6,085,613) for a crankset with no neutral position (top and bottom dead centers) consisting of a fixed bottom bracket tube, two opposed crank arms attached respectively to a hollow outer spindle mounted by bearings over a solid inner spindle. This spindle set includes a pair of output crank arms that transfer force from the pedals to the sprocket by way of articulating connecting rods. The axis of the crank arms (first axis) are offset from that of the chain sprockets (second axis) which are rotating on bearings mounted to the bottom bracket housing by an eccentric plate. With two rotating eccentric centers, the crank arms, the first axis of input, will accelerate and decelerate simultaneously as they rotate given a constant rotation speed of the sprockets, the second axis of output, causing the elimination of top and bottom dead centers. Eccentric drives such as this rely on bearings at the connecting points to help transfer force from the pedals to the chain sprockets. To reduce bearing wear caused by road hazards all bearings are sealed by contact gaskets. While of sufficient design this invention may experience questionable marketability because of its complicated design, reliance on a custom built bottom bracket housing and a considerable amount of additional bearings and gasket seals required to transfer power from the pedals to the chain sprocket. Also, the increased weight, friction and resistance introduced by additional bearings and gasket seals (a conventional pedal drive mechanism has four bearings and two gasket seals within the bottom bracket housing, this invention has thirteen bearings and seven gasket seals) will most likely overcome any mechanical advantage produced by this invention's design.

The present invention corrects many of the principal deficiencies apparent in aforementioned designs. First conceptualized in 1949, the present invention evolved over the years to its current embodiment so designed that a bicycle rider can continually apply force to the drive system without any interruption caused by simultaneous positioning of pedal cranks around top and bottom dead centers of the pedal rotation of a conventional pedal drive mechanism. The present invention incorporates lightweight materials, fasteners and low friction sealed bearings to minimize additional weight and rotational resistance.

SUMMARY OF THE INVENTION

The primary object of the present invention is to provide continuous, uninterrupted torque to the drive chain or belt of a bicycle, or similarly propelled human-powered conveyance, by eliminating the zero torque zones around the top and bottom dead centers of pedal crank rotation. Another object of the present invention is to improve output performance under heavy loads, such as pedaling a bicycle up steep grades when rider input force is at its maximum, i.e. when the forward most rotating pedal crank is descending and parallel to the ground. Another object of the present invention is to create effective variable chain sprocket radii that replicates a larger chain sprocket radius during the power stroke and a smaller chain sprocket radius during the return stoke phases of a pedal cycle.

Other objects and advantages of the present invention will become apparent from the following descriptions, taken in connection with the accompanying drawings, wherein, by way of illustration and example, an embodiment of the present invention is disclosed.

Generally, the present invention concerns a pedal drive mechanism of a type indicated in the preamble consisting of a hub collar and eccentric flange mounted to the bottom bracket housing which establishes two independent axis of rotation separating a rotatively mounted chain sprocket assembly, the first axis, from the bottom bracket bearing of a commonly available bicycle, the second axis; which are connectively joined by links from the pedal cranks to the sprocket assembly to transfer continuous torque to the chain sprocket Therefore, on a conventionally framed bicycle, at the point at which one pedal crank begins its forward and downward rotation from top dead center in the direction of bicycle travel, the opposed, aft-moving pedal crank is 22 degrees before bottom dead center and providing torque to the drive chain. As the pedal cranks rotate, when the forward moving pedal crank is at 11 degrees after top dead center, the opposed, aft-moving pedal crank is at 11 degrees before bottom dead center with both pedal cranks providing torque to the drive chain. As the aft-moving pedal crank rotates and reaches bottom dead center, a point at which the pedal crank begins an upward rotation in the opposite direction of bicycle travel, the opposed, forward moving pedal crank is at 22 degrees after top dead center and providing torque to the drive chain. When the both pedal cranks are horizontal to the ground on a conventionally framed bicycle (90 degrees from top dead center and bottom dead center) they are directly opposed (180 degrees apart).

The drawings constitute a part of this specification and include exemplary embodiments to the present invention, which may be embodied in various forms. It is to be understood that in some instances various aspects of the present invention may be shown exaggerated or enlarged to facilitate an understanding of the present invention.

DETAILED DESCRIPTION OF THE PREFERRED EMBODIMENTS

Detailed descriptions of the preferred embodiments are provided herein. It is to be understood, however, that the present invention may be embodied in various forms. There, specific details disclosed herein are not to be interpreted as limiting, but rather as a basis for the claims and as a representative basis for teaching one skilled in the art to employ the present invention in virtually any appropriately detailed system, structure or manner.

Figure 1:
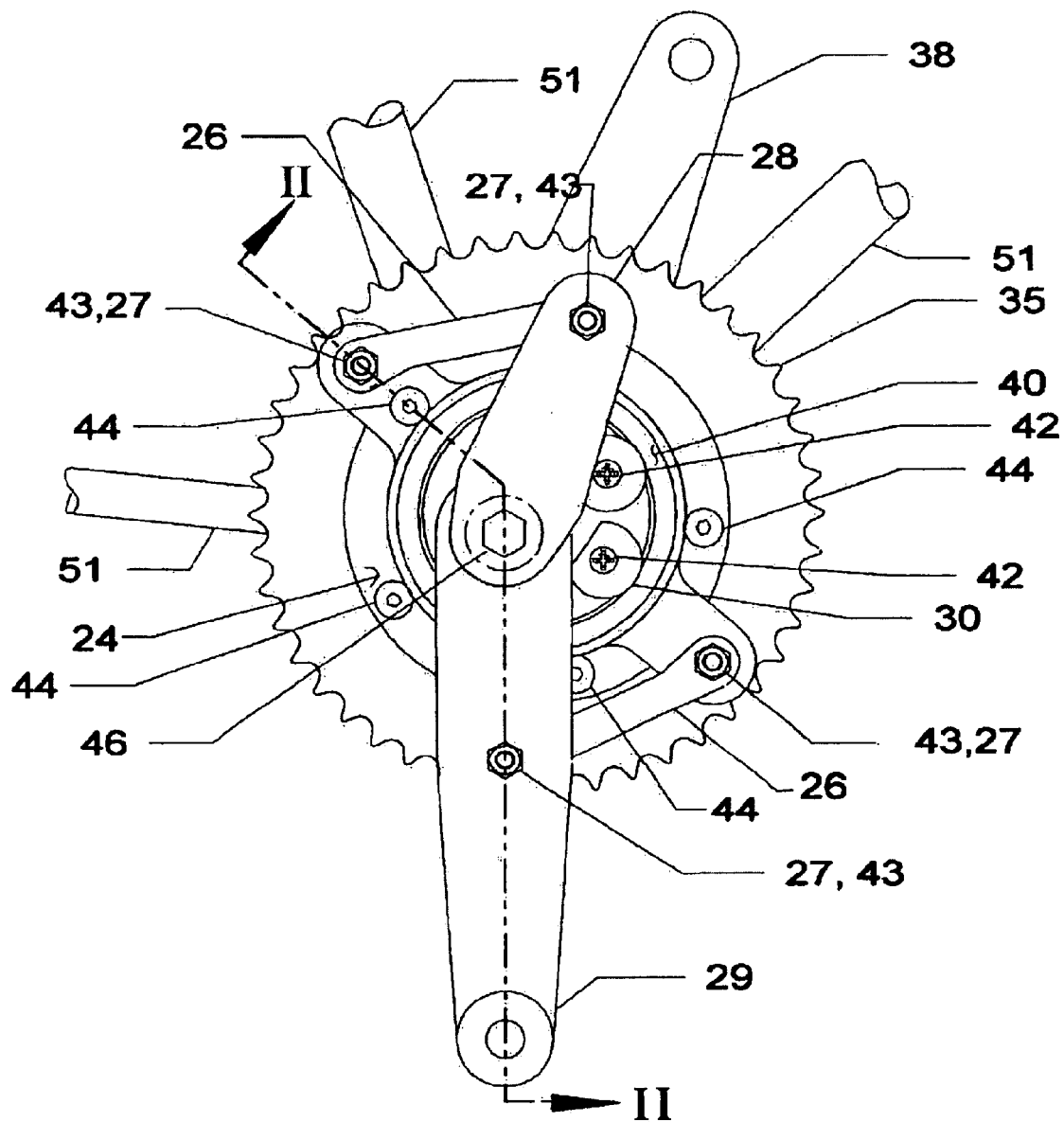
FIG. 1 is a side view of an embodiment of the present invention mounted on the relevant frame segment of a bicycle.
Figure 2:
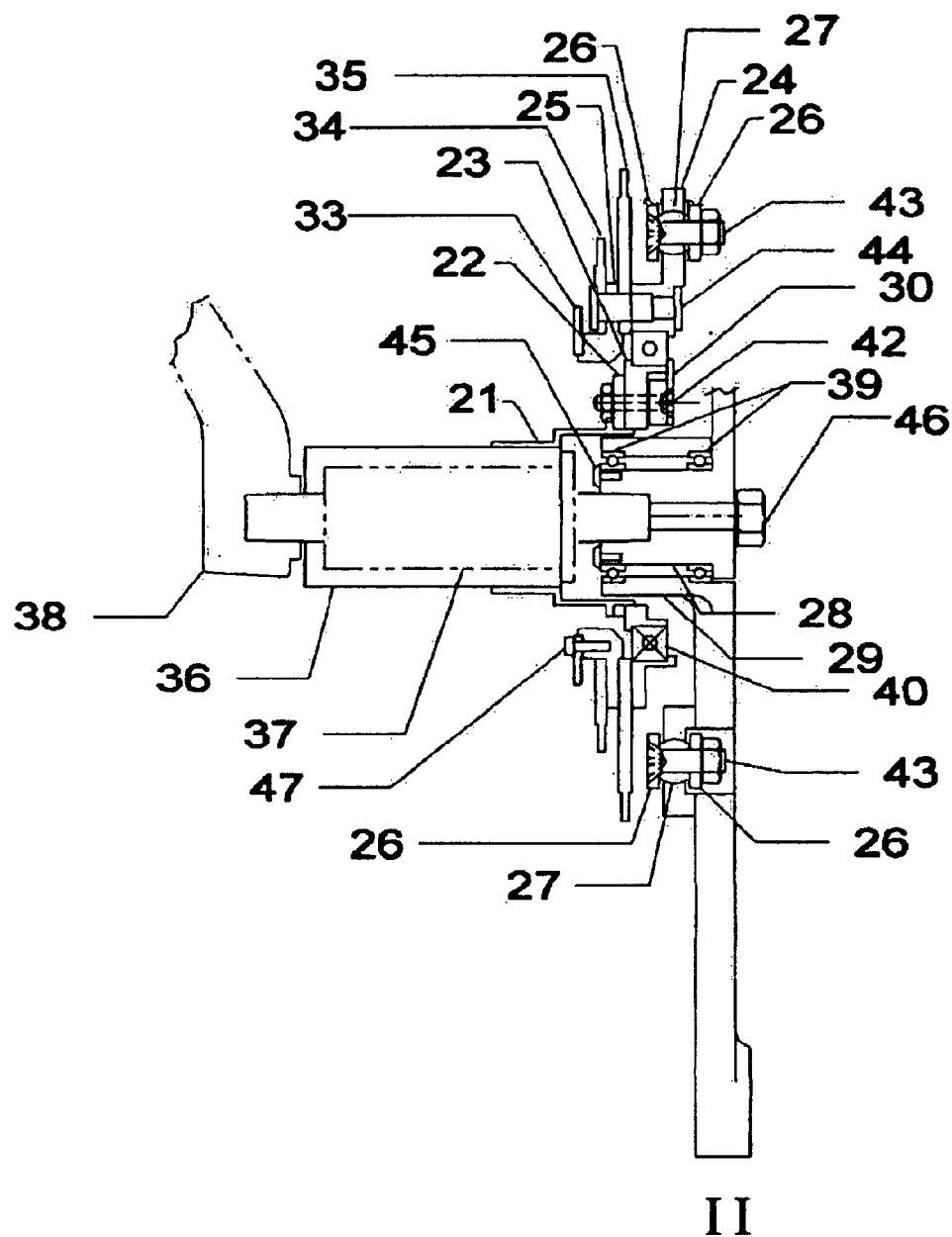
FIG. 2 is a cross section of an embodiment of the present invention along line I—II of FIG. 1.
Figure 3:
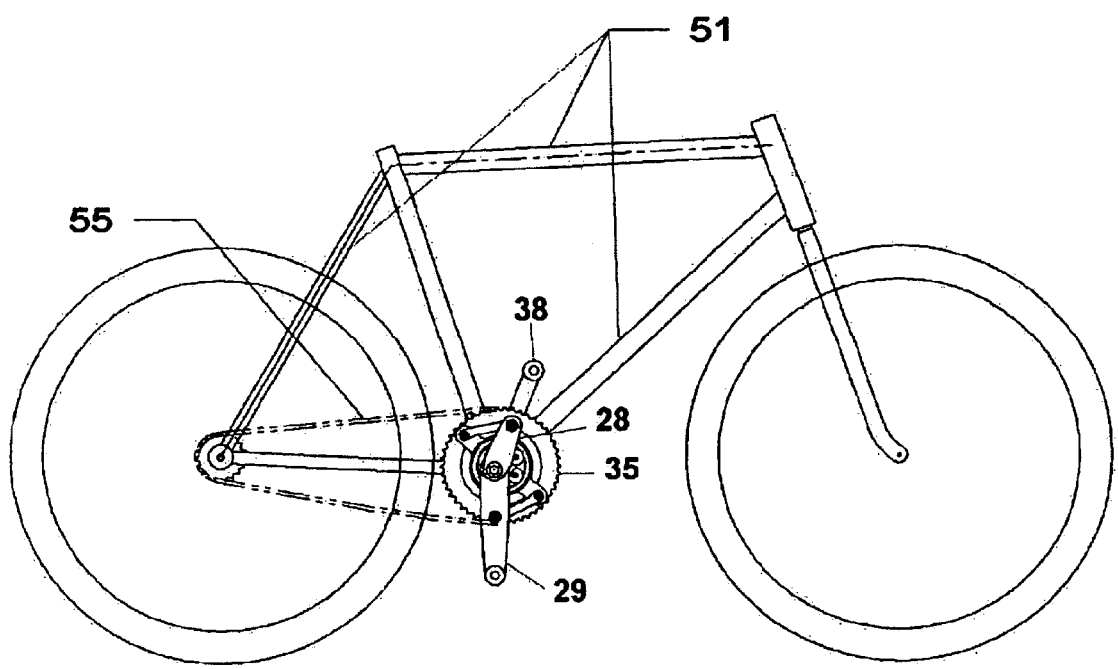
FIG. 3 is a side view of the present invention and drive system on a bicycle frame.

With reference to FIG. 1, FIG. 2, a side view and cross section view, respectively, and FIG. 3, a side view, the present invention is attached to a typical bike frame (51) through the bottom bracket housing (36). The bottom bracket bearing (37) is rotatively mounted within the bottom bracket housing (36) to establish the first axis of rotation. The left pedal crank (38) is attached to the left side of the bottom bracket bearing (37) with fastener similar to (46). Fastener (46) attaches the left pedal output crank (28) to the right side of the bottom bracket bearing (37). The right pedal crank (29) is rotatively mounted about the left pedal output crank (28) by sealed bearings (39) and secured by fasteners (45). The left pedal crank (38) and left pedal output crank (28) rotate on the same radial plane about the first axis. The right pedal crank (29) also rotates about the first axis.

To the bottom bracket housing (36) is attached the bottom bracket hub collar (21) and eccentric flange (22). The bearing inner race support (23) is attached to the eccentric flange (22) with fastener (42) and bearing retainer (30). The sealed bearing (40) mounted about the offset center of the eccentric flange (22) and bearing inner race support (23) establish the second axis of rotation.

Rotatively mounted about the sealed bearing (40) is the sprocket support (24). Fasteners (44) connect the sprocket support (24), the sprocket interface (25) and chain sprockets (34 and 35) together. Chain sprocket (33) is attached to the sprocket interface (25) by fasteners (47). Chain sprockets (33, 34 and 35), sprocket interface (25) and sprocket support (24) rotate about the second axis on sealed bearing (40).

Self-aligning sealed bearings (27) in the sprocket support (24) and rotational output end of the left pedal output crank (28) are connectively joined by articulating links (26). Each end of the articulating links (26) are attached to the sprocket support (24) and output end of the left pedal output crank (28) by fasteners (43). Self-aligning sealed bearings (27) in the sprocket support (24) and rotational mid point of the right pedal crank (29) are connectively joined by articulating links (26). Each end of the articulating links (26) are attached to the sprocket support (24) and the rotational mid point of the right pedal crank (29) by fasteners (43). The rotational mid point and articulating link (26) attachment point of the right pedal crank (29) is on the same radial arc as the articulating link (26) attachment point of the rotational output end of the left pedal output crank (28).

The present invention attached to a bicycle frame (51) at the bottom bracket housing (36) transfers pedal force from the left pedal crank (38), through the bottom bracket bearing (37) to the left pedal output crank (28) which is connectively joined to sprocket support (24) by articulating links (26). Pedal force is transferred from the right pedal crank (29) which is connectively joined to the sprocket support (24) by articulating links (26). The sprocket support (24), sprocket interface (25) and chain sprockets (33, 34 and 35) in turn transfer pedal force to the drive chain (55).

Figure 4:
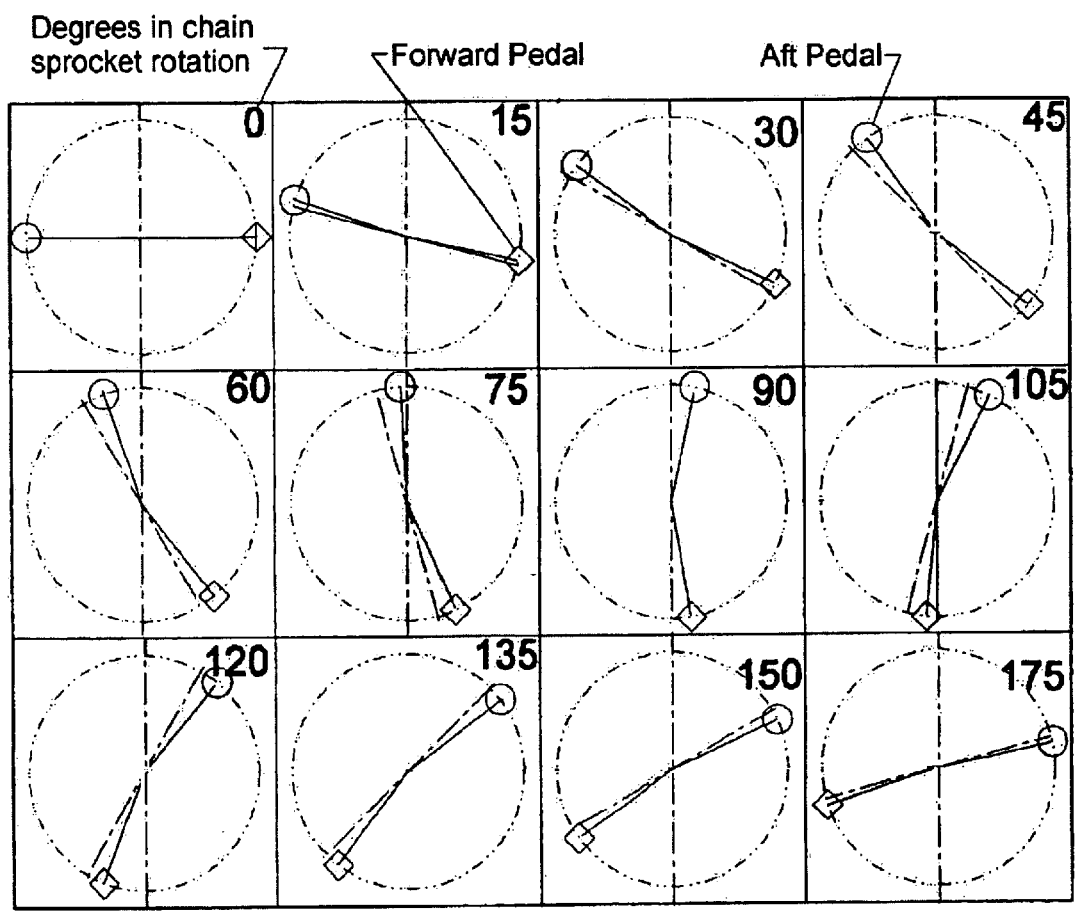
FIG. 4 illustrates the relative positions of both left and right pedal cranks of the present invention compared to that of pedal crank positions of a conventional pedal drive mechanism as they rotate 180 degrees.

FIG. 4 shows the relative positions of both left pedal crank and right pedal crank of the present invention (rotating solid lines with circle and square symbols at ends) compared to the rotative movement of the pedal cranks of a conventional pedal drive mechanism (rotating dot/dashed/dot lines) during a 180 degree rotation, or pedal cycle.

Figure 5:
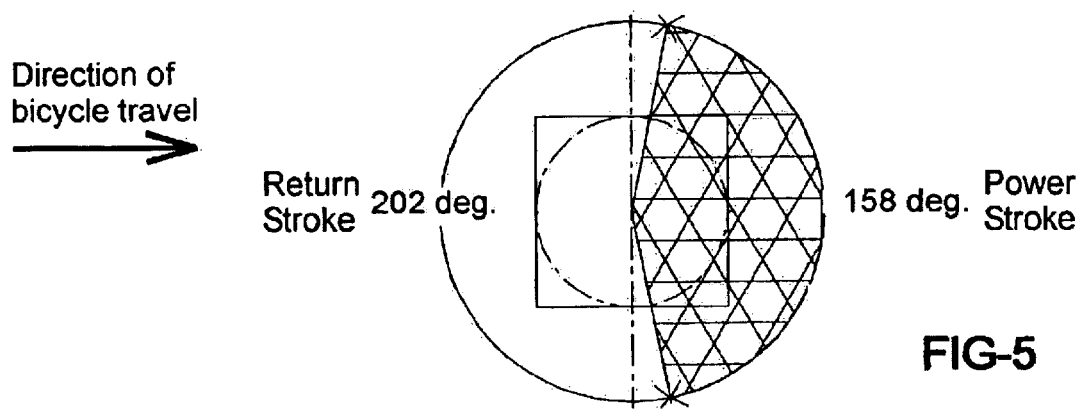
FIG. 5 is a diagram of radial degrees of the power stroke and return stroke of the present invention.

FIG. 5 is a power and return stroke diagram that illustrates the relationship between the power stroke (shaded area) and the return stroke of the present invention in 180 degree increments of chain sprocket rotation. The effective useful torque range of the power stroke of the present invention (shaded area), where most of the bicycle propulsion is derived, is 158 degrees of pedal crank rotation. The power stroke begins at approximately 11 degrees after top dead center and ends approximately 11 degrees before bottom dead center of chain sprocket rotation. Almost all rider exertion for propulsion is within this 158 degree range. The return stroke of the present invention is the 202 degrees of pedal crank rotation. On the return stroke a bicycle rider would have to apply useful torque by lifting up the foot attached to the return stroke pedal.

Studies have shown (Science of Cycling, *Biomechanics of Cycling: Studies of the Pedaling Mechanics of Elite Pursuit Riders,* Cavanagh and Sanderson) almost all of the resultant force exerted in pedaling occurs in the power stroke range, and very little, if any, useful force is applied by the bicycle rider during the return stroke. The present invention is designed to maximize the advantage of the power stroke and return stroke relationship by enabling a bicycle rider to begin the power stroke with one pedal crank while the opposite pedal crank is ending the power stroke. Therefore, as the present invention embodies, there is never a point during the 360 degree of pedal crank rotation where a bicycle rider does not produce continuous, uninterrupted torque. In addition to eliminating areas of zero torque commonly found around the top and bottom dead centers of a conventional pedal drive mechanism, the present invention maintains a constant and more even output force to the drive chain by reducing the disparity between high torque and low torque areas of the pedal cycle.

Figure 7:
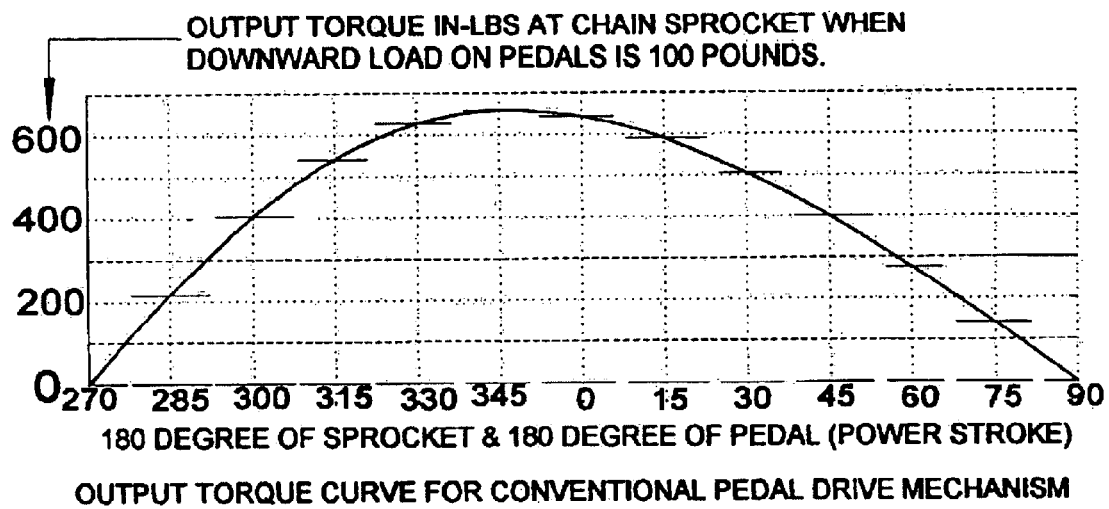
FIG. 7 is a plot diagram illustrating the output torque curve of a conventional pedal drive mechanism.
Figure 6:
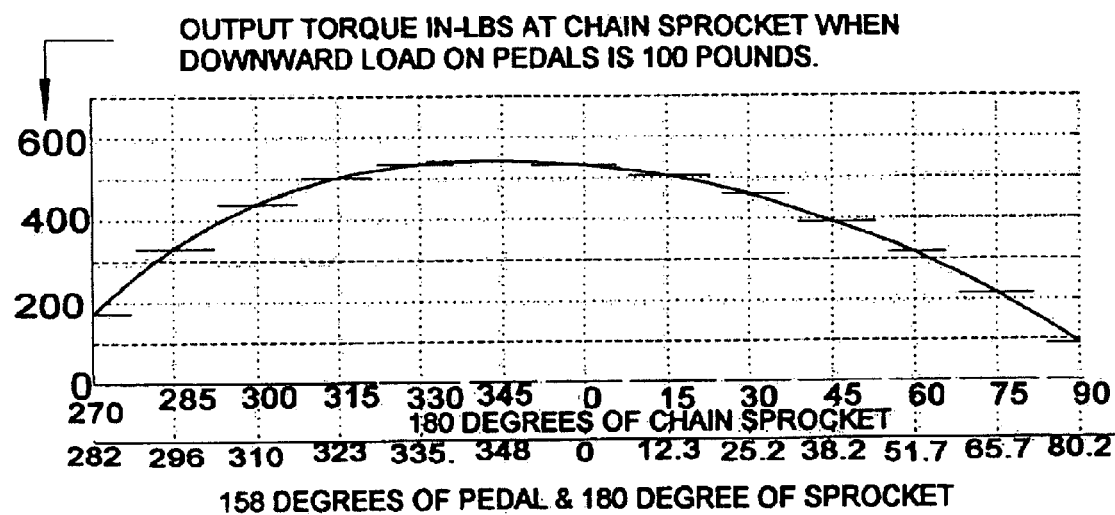
FIG. 6 is a plot diagram illustrating the output torque curve of the present invention.

FIG. 6 and FIG. 7 is a comparison of the output torque curves of the present invention and a conventional pedal drive mechanism, respectively, during a sprocket rotation from 270 degrees to 90 degrees in 15 degree increments. The "X" axis is the rotation degrees of the chain sprocket for a 180 degree rotation. The "Y" axis is the output torque in pounds when the pedal crank force is 100 pounds. The torque curve embodied in the present invention (FIG. 6) has approximately 180 output torque pounds at top dead center and 95 output torque pounds at bottom dead center, thus providing continuous, uninterrupted torque during pedal crank rotation. In FIG. 7 the output torque curve of a conventional pedal drive mechanism has a beginning and ending torque output of zero because the pedal cranks of a conventional bicycle at top dead center and bottom dead center provide zero torque. In addition to providing continuous torque to the drive chain the present invention helps maintain a constant and more even output force by reducing the disparity between high torque and low torque areas of the pedal cycle.

Figure 8:
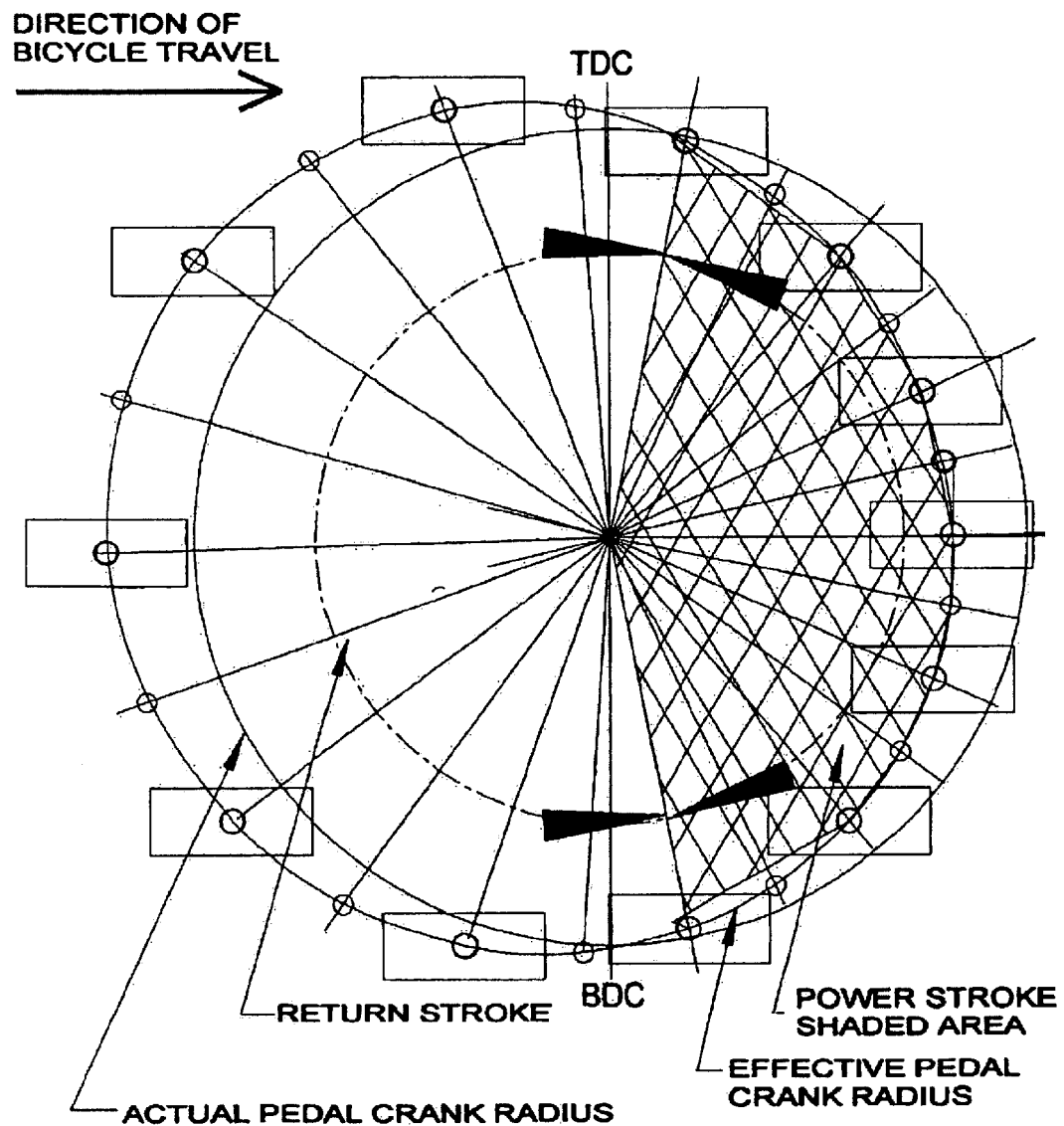
FIG. 8 illustrates the effective variable pedal crank radius replicated by the linked, eccentric first axis and second axis of rotation of the present invention.
Figure 9:
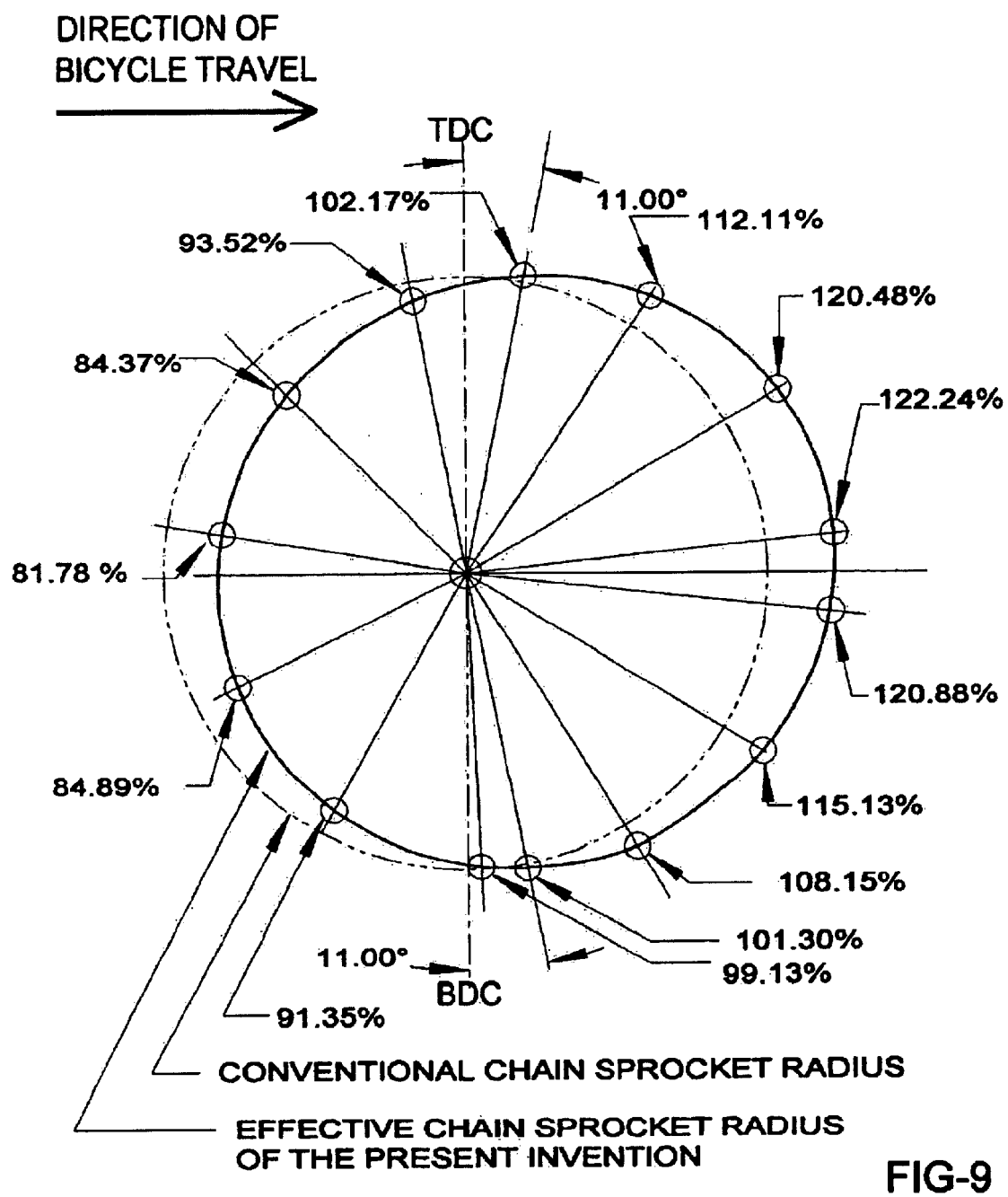
FIG. 9 illustrates the effective variable chain sprocket radius replicated by the linked eccentric axes of rotation of the present invention.

FIG. 8 and FIG. 9 illustrate the effective variable crank radius and resultant effective variable chain sprocket radius replicated by the linked eccentric axes of rotation (first and second axis) of the present invention. Because the pedal cranks, rotating about the first axis, transfer force by articulating links to the chain sprockets, rotating about the second axis, the result is replication of variably shorter pedal cranks in the power stroke (FIG. 8, shaded area) and variably longer pedal cranks in the return stroke. This has the net effect of reducing output torque in the power stroke and increasing output torque in the return strike.

Looking at the augmentation to output torque, a result of the embodiments of the present invention, in terms of chain sprocket radii in FIG. 9, the effect is replication of a variably larger chain sprocket radius in the power stroke (from 11 degrees after top dead center to 11 degrees before bottom dead center) and a variably smaller chain sprocket radius in the return stroke. The actual radius of the chain sprocket (FIG. 9, dot/dash/dot circle) is augmented and reflected in percentage of chain sprocket radius during its rotation about the second axis. As the chain sprocket rotates on the present invention, when the forward-most pedal crank is parallel to the ground (a point on 90 degrees after top dead center) the effective increase in chain sprocket radius is approximately 21 percent making a 46-tooth chain sprocket replicate a 55-tooth chain sprocket at that point. Likewise, as the chain sprocket rotates on the present invention, and the aft-most pedal crank is parallel to the ground (a point on 90 degrees before top dead center) the effective decrease in chain sprocket radius is approximately 18 percent making a 46-tooth chain sprocket replicate a 38-tooth chain sprocket at that point.

Figure 10:
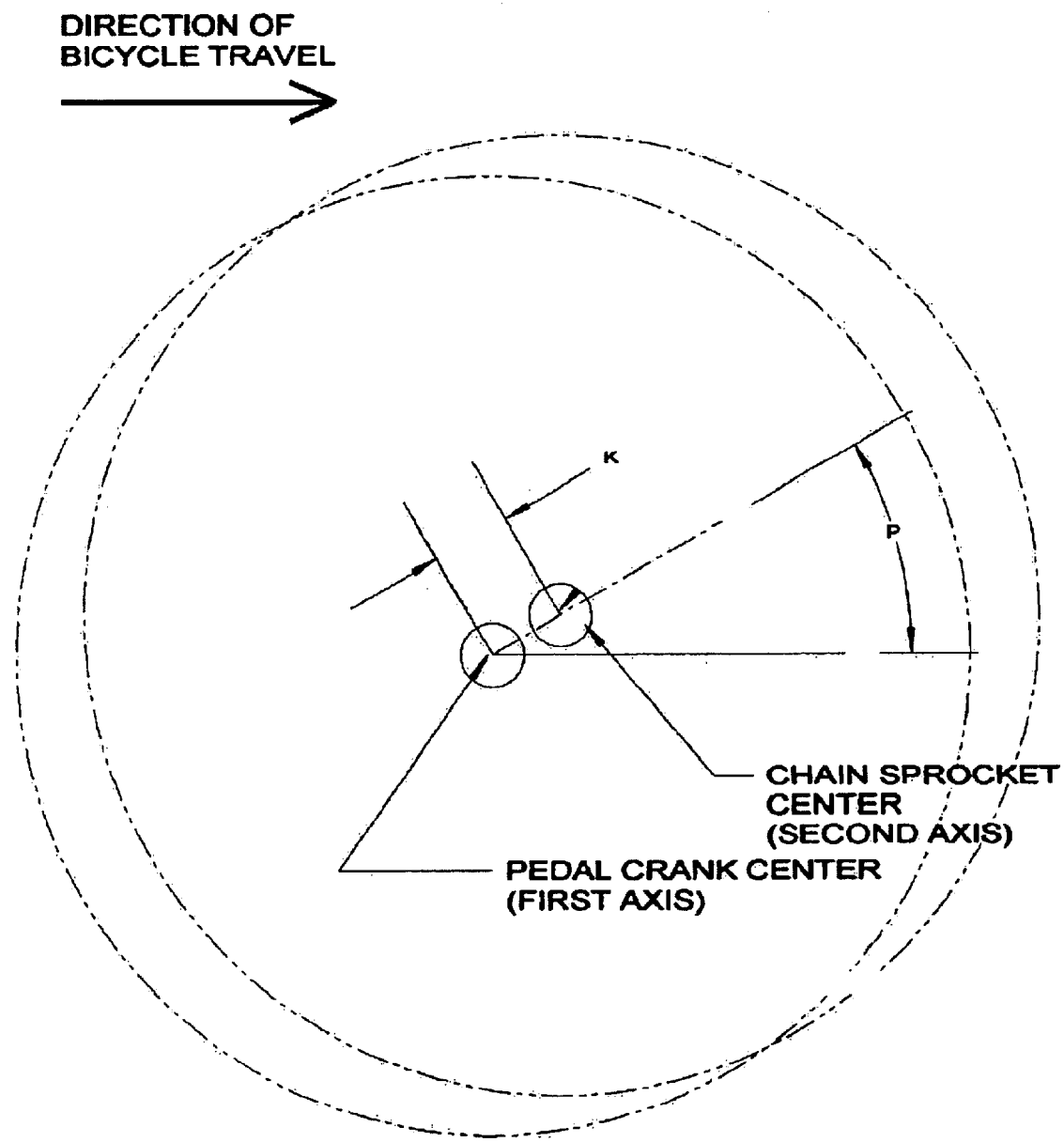
FIG. 10 illustrates the relative positions of the eccentric first axis and second axis of rotation of the present invention.

FIG. 10 illustrates the relative positions of the eccentric drive axes, the first and second axes of rotation of the present invention. The pedal crank center, the first axis of rotation, is the point on which the left pedal crank, left pedal output crank and right pedal crank are attached to the bottom bracket bearing within the bottom bracket housing of a typical bicycle frame. The eccentric flange and bearing inner race support are so mounted to the bottom bracket hub collar, which in turn is mounted about the right side of the bottom bracket housing, where their offset radial centers establish the second axis or rotation. The second axis of rotation is offset 0.50 inches, or 12.7 millimeters (dimension "K") on a 30 degree angle (angle "P") originating from the center of the first axis, the pedal crank center.

While the present invention has been described in connection with a preferred embodiment, it is not intended to limit the scope of the present invention to the particular form set forth, but on the contrary, it is intended to cover such alternatives, modifications, and equivalents as may be included within the spirit and scope of the present invention as defined by the appended claims.

I claim as my invention:

1. A pedal drive mechanism that provides full-time, continuous torque to a drive chain or belt, comprising:
   a) a bottom bracket hub collar adapted to mount to a bottom bracket housing;
   b) a left pedal output crank having a rotational output end and an opposing end, the left pedal output crank being rotatably mounted at the opposing end to said bottom bracket hub collar, such that the left pedal output crank is rotatable about a first axis of rotation,
   c) an eccentric flange and a bearing inner race support on said bottom bracket hub collar, the eccentric flange and bearing inner race support establishing a second axis of rotation parallel to and offset from said first axis of rotation;
   d) a right pedal crank mounted to the bottom bracket hub collar so as to be rotatable about said first axis of rotation separately from the rotation of the left pedal output crank about the first axis of rotation;
   e) a sprocket support mounted on said bearing inner race support such that said sprocket support is rotatable about said second axis of rotation; and
   f) a first articulating link connectively joining said sprocket support with the rotational output end of the left pedal output crank, and a second articulating link joining said sprocket support with the right pedal crank, wherein said first and second articulating links are joined to said left pedal output crank and right pedal crank, respectively, on the same radial arc about the first axis of rotation;
   g) the pedal drive mechanism being adapted to attach externally to a bottom bracket housing and to attach to a bottom bracket bearing disposed within said bottom bracket housing such that the bottom bracket bearing is rotatable together with said left pedal output crank about said first axis of rotation.

2. The pedal drive mechanism of claim 1, wherein the rotation of the left pedal crank and right pedal output crank about the first axis of rotation and the simultaneous rotation of the sprocket support about the second axis of rotation produce dissimilar and variable right pedal crank and left pedal output crank rotation speeds.

3. The pedal drive mechanism of claim 2, wherein the dissimilar and variable right pedal crank and left pedal output crank rotation speeds are characterized in that, for a forward direction of rotation:
   a) when either the right pedal crank or the left pedal output crank is at a top dead center position, said crank at the top dead center position forms an angle of 158° with the other of the right pedal crank or the left pedal output crank, as measured in the forward direction of rotation from the crank at the top dead center position;
   b) when either the right pedal crank or the left pedal output crank is at 11° past the top dead center in the direction of rotation, said crank at 11° past the top dead center position forms an angle of 158° with the other of the right pedal crank or the left pedal output crank, as measured in the forward direction of rotation from the crank at 11° past the top dead center position;
   c) when either the right pedal crank or the left pedal output crank is at a bottom dead center position that is 180° from the top dead center position, the crank at the bottom dead center position forms an angle of 202° with the other of the right pedal crank or the left pedal output crank, as measured in the forward direction of rotation from the crank at the bottom dead center position; and
   d) when either crank is at 90° past the top dead center position, the cranks are at an angle of 180° to each other.

4. The pedal drive mechanism of claim 3, wherein the second axis of rotation is offset from the first axis of rotation by 0.50 inches (12.7 mm) on an angle of 30 degrees from the horizontal, when the first and second axes of rotation are oriented horizontally.

5. The pedal drive mechanism of claim 2, wherein said first articulating link is joined to said sprocket support and left pedal output crank through self-aligning sealed bearings, and said second articulating link is joined to said sprocket support and said right pedal crank through self-aligning sealed bearings.

6. The pedal drive mechanism of claim 5, wherein said first articulating link extends in a forward direction from said sprocket support to the rotational output end of the left pedal output crank, and said second articulating link extends forward from said sprocket support to said right pedal crank.

7. The pedal drive mechanism of claim 6, wherein the dissimilar and variable right pedal crank and left pedal output crank rotation speeds are characterized in that, for a forward direction of rotation:
   a) when either the right pedal crank or the left pedal output crank is at a top dead center position, said crank at the top dead center position forms an angle of 158° with the other of the right pedal crank or the left pedal output crank, as measured in the forward direction of rotation from the crank at the top dead center position;
   b) when either the right pedal crank or the left pedal output crank is at 11° past the top dead center in the direction of rotation, said crank at 11° past the top dead center position forms an angle of 158° with the other of the right pedal crank or the left pedal output crank, as measured in the forward direction of rotation from the crank at 11° past the top dead center position;
   c) when either the right pedal crank or the left pedal output crank is at a bottom dead center position that is 180° from the top dead center position, the crank at the bottom dead center position forms an angle of 202° with the other of the right pedal crank or the left pedal output crank, as measured in the forward direction of rotation from the crank at the bottom dead center position; and
   d) when either crank is at 90° past the top dead center position, the cranks are at an angle of 180° to each other.

8. The pedal drive mechanism of claim 1, 2 or 7, wherein at least one chain sprocket is mounted to the sprocket support.

9. The pedal drive mechanism of claim 8, wherein the movement of a portion of said chain sprocket through an angle from 0 to 180° from the top dead center position in the direction of rotation produces the effect of a greater radius chain sprocket, and the movement of said chain sprocket through an angle of 180–360° from the top dead center position in the direction of rotation produces the effect of a smaller radius chain sprocket.

10. The pedal drive mechanism of claim 2 which is mounted externally to a bottom bracket housing of a bicycle frame and to a first end of a bottom bracket bearing disposed within the bottom bracket housing.

11. The pedal drive mechanism of claim 10, wherein the bottom bracket bearing has a second end, and a left pedal crank is mounted to said second end of the bottom bracket bearing such that said left pedal crank and left pedal output crank rotate on the same radial plane about said first axis of rotation.

12. The pedal drive mechanism of claim 1 which is mounted externally to a bottom bracket housing of a bicycle frame and to a first end of a bottom bracket bearing disposed within the bottom bracket housing.

13. The pedal drive mechanism of claim 12, wherein the bottom bracket bearing has a second end, and a left pedal crank is mounted to said second end of the bottom bracket bearing such that said left pedal crank and left pedal output crank rotate on the same radial plane about said first axis of rotation.

14. The pedal drive mechanism of claim 13 wherein a pedal is attached to each of said left pedal crank and right pedal crank.

* * * * *